United States Patent Office 3,411,800
Patented Nov. 19, 1968

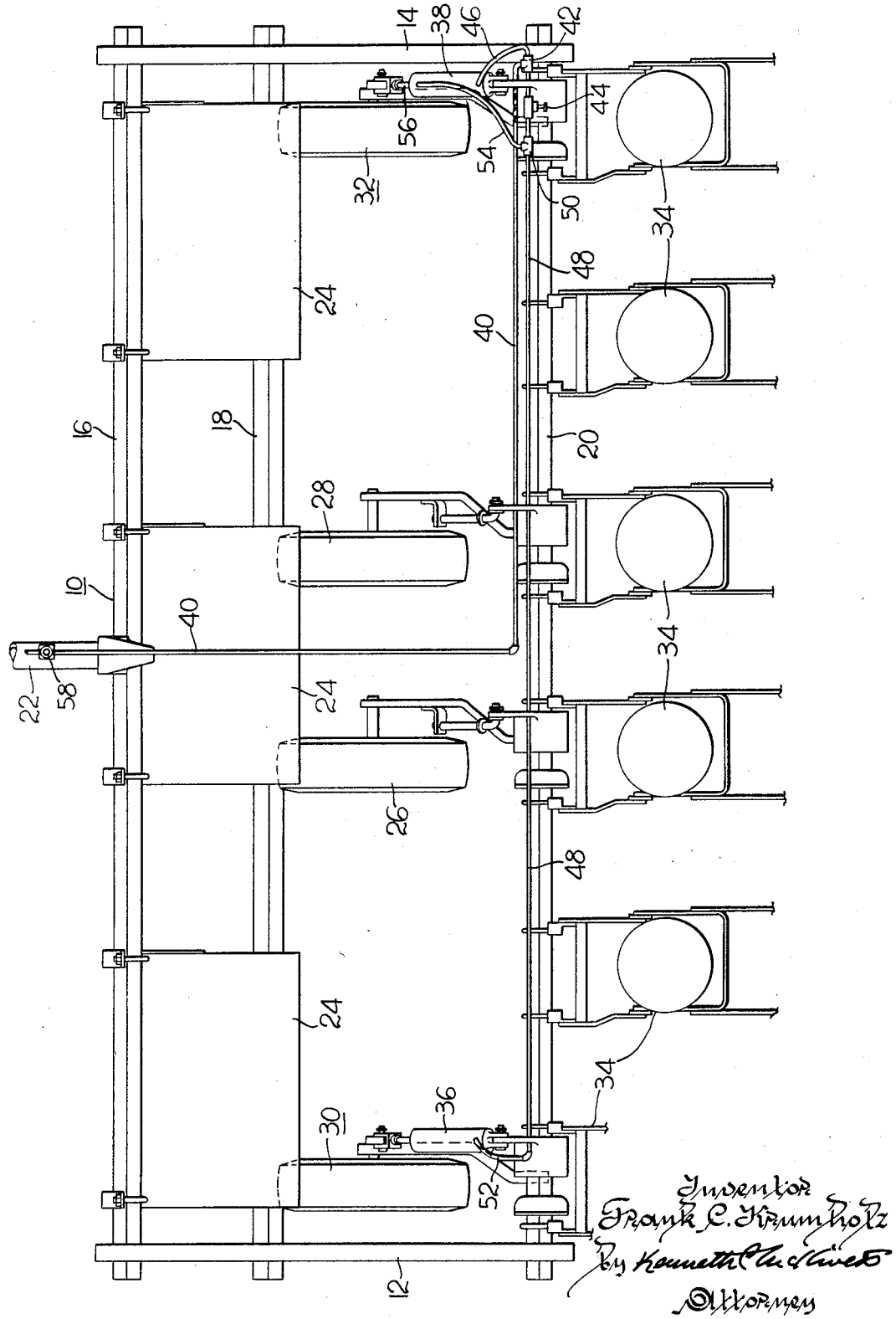

3,411,800
PLANTER POWER LIFT
Frank C. Krumholz, Hales Corners, Wis., assignor to Allis-Chalmers Manufacturing Company, Milwaukee, Wis.
Filed Sept. 23, 1966, Ser. No. 581,471
2 Claims. (Cl. 280—43.23)

ABSTRACT OF THE DISCLOSURE

This disclosure is of a wide implement with adjustable height wheels supporting same and hydraulic means for raising and lowering all wheels at the same time and rate.

---

This invention relates to a hydraulic lift for a multi-row unit type planter. In multiple unit planters requiring two lift wheels to support the planters in a raised inactive position for transport, the conventional concept has been to provide a lift arrangement whereby the two transport wheels and their supporting standards are united by a cross member thereby forming a crank axle which is actuated by a hydraulic ram to selectively raise or lower the planter. This method was generally successful, however, it did have the disadvantage of limiting the flexibility of the planter to accommodate the wide variety of row spacings and planting methods to meet the growing diversity of agricultural practices.

To improve the versatility of unit type planters adjustably mounted transport wheels were provided on the planter frame so that these wheels can be moved laterally and are actuable vertically by separate hydraulic rams. This arrangement increases the amount of obtainable row spacings and permits the planter to be easily converted from conventional planting to wheel track planting. The first such arrangement for actuating the separate lift rams consisted of dividing the pressure fluid by means of a T connection with each branch from the T going to one of the two rams. This method resulted in an uneven lift with the ram encountering the greater resistance, usually the planter side with the extended marker, lifting last. This was found to be objectionable from the standpoint of appearance and possible damage to the frame, pivots and the like. Various devices such as variable restrictions were tried, however, none of these were successful. The equal extension of two remote rams supplied from a single pressure fluid source was successfully solved by the present invention. This inventive arrangement includes a primary one way hydraulic ram powered by the tractor hydraulic system, a second slave ram, proportionally smaller than the primary ram, with said slave ram being actuated by pressure fluid discharge from the rod end of the primary ram by means of a closed hydraulic circuit. The differential in ram size compensates for the fluid displaced by the piston rod of the larger primary ram to equalize the volume and effective piston area of each ram to assure equal correlated movement of the two planter transport wheels.

An additional desirable feature of this invention is the ease with which air can be purged from the planter hydraulic system.

Another object of this invention is to provide a hydraulic transport lock for retaining planters in raised position without danger of lowering.

The foregoing and other objects and advantages of this invention will become apparent from the following detailed specification, appended claims and attached drawing.

The drawing shows a plan view of a wheeled vehicle frame embodying the invention and shown as a carrier for multiplanter units.

Referring now to the drawing, a six row planter includes a frame 10 provided with longitudinally extending frame members 12 and 14 joined by laterally extending tubular members 16, 18 and 20. The planter is connected to a tractor (not shown) by means of a tubular hitch member 22. Fertilizer hoppers 24 are supported on the forward portion of the planter frame 10 and the mechanisms of hoppers 24 are driven by wheel unit 26 by conventional means (not shown). Wheel unit 26 is adjustably secured to the rear frame member 20. Wheel 26 also functions as a compacting wheel for the row in which it operates. A compacting wheel 28 is provided to pack the corresponding row on the opposite side of drawbar 22. Lift wheel units 30 and 32 are secured for lateral adjustment on planter frame tube member 20. Six planting units 34 are adjustably secured to planter frame tube 20 in a conventional manner. Lift wheels 30 and 32 also function as compacting wheels for the planter units in front of which they are mounted. The tractor drive wheels (not shown) also function as compacting wheels. Such tractor wheels being positioned in front of the second planter units from each end.

The lift of transport wheels 30 and 32 are pivotally mounted on the frame tube 20 and are provided with hydraulic cylinders 36 and 38, respectively, which operate to pivot the wheel units 30 and 32 thereby moving the planter frame 10 and associated planting units 34 to an elevated transport position or to a lowered operating position. It should be understood here that this six row unit is of the order of 15 feet wide and from an appearance standpoint as well as from a possible damage and extended wear life standpoint it is desirable for the lift wheels to pivot in unison so as to provide the planter frame with a lever lift.

The illustrated hydraulic lift arrangement consists of a main hydraulic line 40 which is connected to a source of pressurized fluid such as a pump mounted on a towing tractor (not shown). Hydraulic line 40 terminates in a T connection 42 located on the right hand side of the planter frame. One branch of the T 42 is selectively blocked by a manually actuated shut-off valve 44 while the other branch of the T connection 42 connects to the base end of master lift cylinder 38 by means of hose 46. A second hydraulic line 48 connects by means of a T 50 to the opposite end of shut-off valve 44 and extends across the planter frame 30 to connect to the base end of the hydraulic slave cylinder 36 by means of a hose 52. A branch of the T 50 is also connected to the rod end of the master lift cylinder 38 by means of a hose 54. In this particular setup, it should be noted that the master cylinder is a 3″ ram and is larger than the slave cylinder which is a 2½″ ram. This ram size differential along with a selected diameter for the master cylinder rod provides compensation for the fluid displaced by the rod 56, and equalizes the volume of the rod end of master cylinder 38 with the base end of slave cylinder 36.

In operation, hydraulic pressure fluid under control of the operator seated on the tractor is directed to master cylinder 38 through line 40. This pressure fluid causes master cylinder 38 to extend because the fluid path to slave cylinder 36 is blocked by valve 44. As the master cylinder extends oil trapped in its rod end is pressurized and this pressurized fluid directed through line 48 causes the slave cylinder 36 to extend an equal amount at the same rate.

To purge the planter hydraulic system of air and to charge the slave circuit with oil, it is only necessary to open valve 44 and cycle the planter lift mechanism two or three times. This vents the air back through the oil in the circuits to the tractor sump. No bleeding of the system is required.

The fluid in the planter hydraulic circuit can be trapped and serves as a transport stop by having a shut-off valve 58 located between line 40 and the quick coupler (not shown) to the tractor. This valve hydraulically locks the planter in its raised position when disconnected from the tractor and takes the pressure off of the quick coupler making for easier connection to the tractor.

This invention has been tested and found to be satisfactory for the accomplishment of the aforementioned objects and advantages; and while a particular embodiment thereof in the nature of a planter has been shown and described above, it should be understood that the same may be modified without departure from the scope and spirit of the appended claims.

The embodiments of the invention in which an exclusive property or privilege is claimed are defined as follows:

1. A wheeled laterally extending implement frame adapted to be attached to a traction vehicle, the improvement comprising hydraulic means for simultaneously and equally raising said laterally extending frame, said hydraulic means including a first hydraulic cylinder operatively connected to one side of said laterally extending frame and hydraulically connected to a source of pressure fluid, a hydraulic slave cylinder connected in series to said first cylinder and adapted to be hydraulically actuated when said first cylinder is actuated, said slave cylinder being connected to the other side of said laterally extending frame for raising same, the hydraulic capacity of the cylinder end of said slave cylinder being equal to the capacity of the piston rod end of said first cylinder whereby a series connection therebetween results in said frame raising at the same rate and same time, ground engaging wheels pivotally attached to said laterally extending frame, said hydraulic cylinders being operatively connected to said wheels for raising and lowering same, and means for selectively connecting said slave cylinder to said source of hydraulic pressure fluid in parallel with said first cylinder or for connecting said slave cylinder in series with said first cylinder.

2. The combination recited in claim 1 and wherein means are provided for trapping hydraulic fluid in said hydraulic cylinders for maintaining said frame in a desired elevated position after said frame is disconnected from said traction vehicle.

References Cited
UNITED STATES PATENTS 2,641,886  6/1953  Graham _____ 280—43.23
3,240,506  3/1966  McMullen _____ 280—43.23

BENJAMIN HERSH, *Primary Examiner.*

ROBERT R. SONG, *Assistant Examiner.*